March 17, 1970    C. F. DE MEY II, ETAL    3,501,242
PIVOTING SAMPLE CELL HOLDER
Filed Nov. 6, 1967
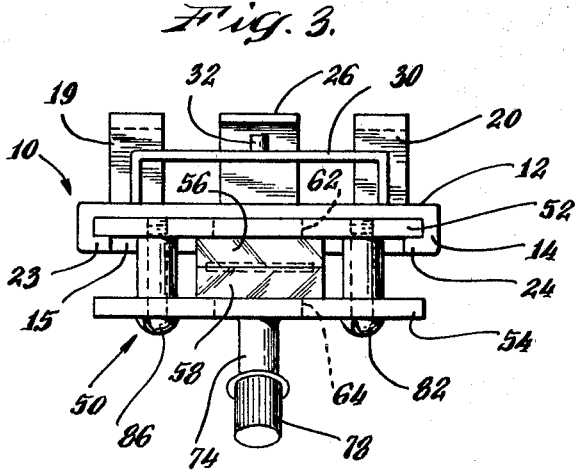
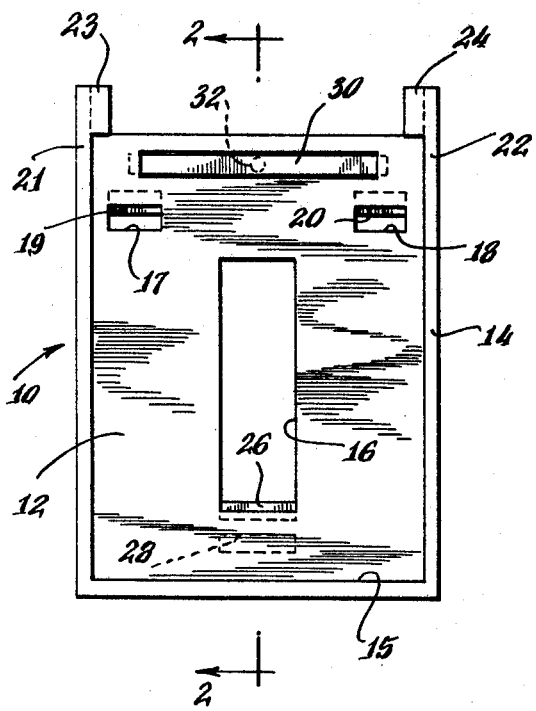
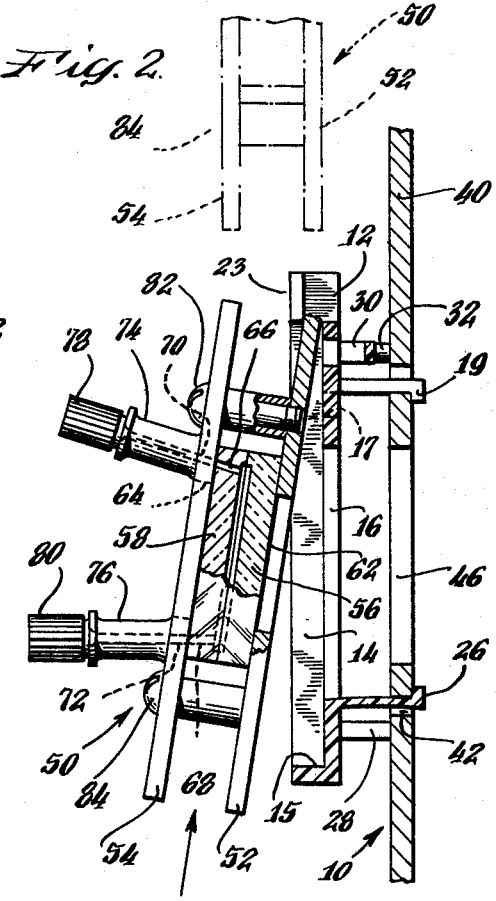
INVENTOR.
Charles F. de Mey II
BY Igor E. Dolgen
ATTORNEY.

United States Patent Office 3,501,242
Patented Mar. 17, 1970

3,501,242
PIVOTING SAMPLE CELL HOLDER
Charles F. de Mey II, West Redding, and Igor E. Dolgen, Monroe, Conn., assignors to The Perkin-Elmer Corporation, Norwalk, Conn., a corporation of New York
Filed Nov. 6, 1967, Ser. No. 680,868
Int. Cl. G01n 1/10
U.S. Cl. 356—246                                    4 Claims

ABSTRACT OF THE DISCLOSURE

An improved holder for sample cells of the type used for example in spectrophotometers, can accept existing cell assemblies either by the present technique of sliding the cell assembly (generally downwardly) into the holder, or by a new, pivoting motion in conjunction with a short upward movement. The sample holder is provided with short, inwardly extending ears on its top, which not only act as short tracks for accepting slide engagement of the cell flanges, but also act analogously to a releasable pair of hinge ears for accepting the upper edge of the cell assembly flanges for the pivoting hinge-like connection.

---

This invention relates to a means and technique for releasably holding a sample cell assembly in optical testing instruments (e.g., spectrophotometers).

More particularly the invention concerns a sample holder for releasably receiving the edges of the back plate (or other flange-like edges) of sample cell assemblies of known type. The sample cell holder of the invention is characterized by its ability not only to engageably receive (the back plate of) the sample cell assembly by a conventional long sliding movement, but also by a pivoting movement (in conjunction with an extremely short sliding movement). The sample cell holder of the invention is also extremely simple in structure and adapted to economical manufacture.

An object of the invention is the provision of a sample holder which allows the sample cell to be releasably engaged in two different manners.

A related object of the invention is the provision of such a sample holder which releasably engages the sample cell assembly not only by a conventional long sliding movement but also by a simple pivoting movement.

Another object of the invention is the provision of such a sample holder which is simple and economical to manufacture.

Further objects, advantages and features of the invention will become obvious to one skilled in the art upon reading the following detailed description of a single preferred embodiment of the invention, in conjunction with the accompanying drawing, in which:

FIG. 1 is a front elevation view of a sample cell holder according to the invention;

FIG. 2 is a vertical cross section of the sample holder, taken on line II—II in FIG. 1, also showing how a sample cell assembly of the known type may be introduced into the sample holder; and FIG. 3 is a plan view of the same sample holder with the known type of sample cell assembly in its fully engaged position.

In FIG. 1 a sample holder of the invention (referenced generally 10) comprises a main plate 12 integrally formed with a projecting peripheral rim or flange 14, extending about both sides and the bottom of the plate. Main plate 12 is apertured so as to form a relatively large hold 16 to allow passage of the radiation beam of the optical instrument with which the holder is used. The plate may also contain smaller apertures at 17 and 18 for simplifying the molding of the holder 10. Mounting tabs 19 and 20, visible through apertures 17 and 18 in FIG. 1, assist in supporting the holder in the optical instrument, as will be described hereinafter.

The upper part of the side portions of peripheral rim 14 extend slightly above the upper edge (13) of the main plate 12, as indicated at 21 and 22. Extensions 21 and 22 have integrally formed, inwardly extending ears or tabs 23 and 24 respectively, which form a major part of the means for releasably engaging the sample cell assembly, as will appear hereinafter. A rearwardly extending thin and springy tab 26 is also visible in FIG. 1, which tab forms another part of the exemplary means for supporting the holder on an optical instrument.

The sectional view of FIG. 2 shows not only one of the upper mounting tabs 20 and the lower mounting tab 26, but also a lower locating stud 28 and a resilient biasing member 30. As best seen in FIG. 3, biasing member 30 may consist of two widely spaced short attaching portions extending from the back of plate 12 and a relatively long thin horizontal bar portion, bearing at its center a small extension or stud 32. The center of the long thin horizontal portion of biasing member 30 will therefore be pressed toward plate 12 (i.e., to the right in both FIGS. 2 and 3) when the stud 32 bears against a supporting wall of the instrument to which the holder 10 will normally be attached. Thus the holder 10 may be attached to a vertical wall of an optical instrument by introducing the mounting tabs (19, 20 and 26) into appropriate holes or recesses in the vertical wall 40 of the optical instrument (the hole cooperating with the lower springy mounting tab 26 being indicated at 42). The resilient biasing member 30 in conjunction with the lower locating stud 28 assures that the holder 10 is securely mounted on the instrument wall 40. Wall 40 will of course have an aperture 46 generally aligned with aperture 16 in plate 12 of holder 10 so as to avoid interfering with the radiation beam of the instrument.

For exemplary purposes only, a sample cell of a known type intended to hold liquid samples is shown to illustrate how the sample holder of the invention may releasably hold sample cell assemblies of this general kind. It is emphasized that the sample cell assembly, generally shown at 50 in FIGS. 2 and 3, is merely exemplary and forms no part of the present invention. Such known liquid sample assemblies may comprise two spaced substantially rectangular plates (say, of metal) at 52 and 54, between which are sandwiched a pair of cell block members 56 and 58 of transparent material. At least one of the confronting faces of cell block members 56 and 58 is recessed so as to form a space 60 into which the liquid sample may be introduced. The back and front plates 52, 54 have similar rectangular apertures at 62, 64 respectively to allow passage of the radiant beam of the instrument. Means for introducing the sample into the volume 60 may comprise one or more passages 66, 68 through the front cell block member 58, communicating passages (70, 72, respectively) to the front plate 54, filling nipples 74, 76 and stoppers (78, 80, respectively). A plurality of screws tending to move the main cell assembly plates 52 and 54 toward each other tightly sandwich the transparent cell block members 56 and 58 therebetween (peripheral gaskets and/or cement, not shown, may be used between any of the parts to insure tightness). In the exemplary cell assembly there are assumed to be four such screws forming a rectangular pattern, so that one of the screws (82) is visible in both FIGS. 2 and 3 and a different one of the remaining three screws is seen (at 84 and 86, respectively) in FIGS. 2 and 3.

The exemplary sample cell assembly 50 may be introduced into the sample holder of the invention by a long substantially vertically downward movement of the assembly into the holder starting from the position indicated (at 50') in dotted lines in FIG. 2 in a manner directly analogous to that presently used for releasably mounting such sample cell assemblies. When the cell assembly 50 is so introduced into the holder 10, the inwardly extending ears 23 and 24 act as (short) slides or tracks for engaging the peripheral side edges of the back plate 52 of the cell assembly (see FIG. 3).

The main functional novelty of the cell holder 10 of the invention is its ability to accept such a cell assembly 50 by a short pivoting motion (coupled with a very short upward motion of the cell assembly). The cell assembly 50 is shown in FIG. 2 with the upper parts of the horizontal edges of the rear main plate 52 just engaged by the lower part of the ears (23, 24 of the holder 10. Pivoting of the cell assembly from the position shown in full line in FIG. 2 about an (horizontal) axis substantially at the point where the ears touch the plate 52 followed by a slight upward movement of cell assembly 50 will cause the front surface (i.e., the right-hand surface in FIG. 2) of plate 52 to be engaged behind the rear (i.e., left-hand in FIG. 2) surface of ears 23 and 24; and cause the lower edge of plate 52 to rest on the upper surface 15 of the lower part of the peripheral rim 14 of the sample holder.

It should be noted that the cell is held securely once seated in the holder, since gravity assists in securing it. In particular, the center of gravity of the cell (or other accessory) is to the left (in FIG. 2) of where ears 23, 24 engage the top of plate 52, so that the tendency of the cell to pivot assists in holding the plate 52 tight against the holder and also in engagement with the upper surface (15) of bottom part of rim 14.

Since the upper edge 13 of the main plate 12 of the sample holder is no higher than the lowermost part of ears 23 and 24 (see FIGS. 1 and 2), neither the exact angle of introduction nor the exact manner in which the pivoting and short upward movement of the cell assembly is accomplished is critical. Thus the cell assembly 50 may be easily introduced into the sample holder 10 with a relatively short and simple motion by the operator. In addition to the obvious convenience of such short and simple movement, the sample holder of the invention also affords the advantage of allowing certain odd-shaped (or oversize) sample cell assemblies to be mounted in an instrument which may have some structure or another accessory immediately over the sample holder which would interfere with the introduction of such a sample cell assembly if it had to be mounted in the conventional long downward movement path. Of course, the operator still enjoys the option of introducing (or removing) the cell assembly in this straight downward conventional manner, if he so prefers (or in those few cases in which unusually shaped cell assemblies may be more easily introduced directly from the top of the sample holder).

The sample holder of the invention thus allows a cell assembly to be mounted (and unmounted) by a simple, short essentially pivoting motion without interfering with its adaptability to receive the cell assembly by a long vertical sliding motion. The entire holder proper (i.e., all elements referenced with numerals from 10 through 32) may be integrally formed in a single molding operation using a synthetic resin. In fact such an integrally molded sample holder (generally conforming to the one shown) has already been successfully made, in which the molded material was acetal resin. The natural springiness of the relatively small cross section horizontal part of biasing member 30 eliminates the need for supplying additional separate springs or the like for mounting a sample holder integrally made of this or similar materials.

As previously pointed out the particular sample cell assembly 50 shown is merely exemplary of one type of such assembly that may be releasably mounted in holder 10. Obviously the illustrated sample holder 10 may hold any one of a large variety of cell assemblies, some of which may markedly differ from the exemplary cell assembly shown, not only in details but in its entire configuration. Thus any cell assembly having either a plate (analogous to that shown at 52) or laterally extending flanges which are spaced a given distance apart may be accommodated by the sample holder 10 of the invention. The holder of the invention is therefore completely adaptable to hold almost any type of sample cell or similar accessory, including such cell assemblies and other accessories as already exist (and intended for vertical sliding engagement with existing sample cell holders). Obviously the sample holder of the invention may also be made in different overall sizes and modified relative dimensions to accommodate cell assemblies (and other accessories) having substantially different size mounting elements (i.e., plates or flanges). Although integral molding of the means (elements 19–32) for mounting the holder to the instrument greatly reduces the cost of utilizing the sample holder in optical instruments, obviously other means may be used instead. The invention is therefore not limited to the details of these or any other elements of the preferred exemplary embodiment, but rather is defined solely by the scope of the appended claims.

We claim:

1. A sample holder for releasably supporting a cell assembly of the type having laterally extending flange-like mounting members, comprising:
   a substantially plane main vertical plate;
   a raised peripheral rim extending forwardly from at least portions of both side edges and the bottom edge of said main plate;
   the upper parts of said peripheral rim extending substantially beyond the upper edge of said main plate;
   tab-like ears on the forward edges of the confronting faces of said upper parts of said peripheral rim;
   said ears therefore extending inwardly so as to define short tab-like tracks substantially parallel to but spaced from the front surface of said main plate, which tracks are adapted to slidingly engage the flange-like mounting members of said cell assembly;
   the bottom of each of said ears being at least in the vicinity of said upper edge of said main plate;
   whereby said cell assembly may be mounted into said holder, not only by a long vertical movement in which said ears act as sliding tracks for the flange-like mounting members of said cell assembly, but also by first introducing the upper part of the cell assembly flange-like mounting members behind the bottom of said ears and then pivoting the cell assembly to cause said mounting members to be introduced between and to be laterally supported by the side parts of said raised peripheral rim and to cause a lower portion of said cell assembly to be supported against gravity by the lower part of said peripheral rim.

2. A sample holder according to claim 1, in which:
   said main plate, said raised peripheral rim and said ears are all formed as a single integral unit.

3. A sample holder according to claim 2, in which:
   said integral main plate, rim, and ears are of a moldable synthetic resin.

4. A sample holder according to claim 2, in which:
   integrally formed means extend rearwardly from said main plate for attaching said main plate to an adjacent part of an instrument in which said sample holder is used.

References Cited

UNITED STATES PATENTS

| 2,015,949 | 10/1935 | Maw. |
| 2,056,791 | 10/1936 | Logan. |
| 2,062,587 | 12/1936 | Logan et al. |
| 3,363,503 | 1/1968 | Shifrin. |

RONALD L. WIBERT, Primary Examiner.

W. A. SKLAR, Assistant Examiner.